May 25, 1965     R. G. SHELLEY     3,185,817

GYROSCOPE FILTERING AND COMPUTING SYSTEM

Filed Sept. 30, 1954     4 Sheets-Sheet 1

*INVENTOR.*
RULON G. SHELLEY
BY William R. Lane

ATTORNEY

INVENTOR.
RULON G. SHELLEY
BY William R. Lane
ATTORNEY

May 25, 1965

R. G. SHELLEY 3,185,817

GYROSCOPE FILTERING AND COMPUTING SYSTEM

Filed Sept. 30, 1954

INVENTOR.
RULON G. SHELLEY

BY *William R. Lane*

ATTORNEY

May 25, 1965

R. G. SHELLEY 3,185,817

GYROSCOPE FILTERING AND COMPUTING SYSTEM

Filed Sept. 30, 1954

INVENTOR.
RULON G. SHELLEY

BY William R. Lane

ATTORNEY

United States Patent Office 3,185,817
Patented May 25, 1965

3,185,817
GYROSCOPE FILTERING AND COMPUTING SYSTEM
Rulon G. Shelley, Downey, Calif., assignor to North American Aviation, Inc.
Filed Sept. 30, 1954, Ser. No. 459,401
8 Claims. (Cl. 235—61.5)

This invention relates to a signal smoothing and computing system, and more particularly, to the use of a gyroscope for filtering signals representing target range and in computing target velocity in a fire control system.

The fire control problem involves the smoothing of signals as well as the computing of other information from such signals. This invention utilizes a delicate balance between smoothing and the time lag of the smoothed and computed signals. This invention further emphasizes that range signals received from a radar in a fire control system represent the magnitude only of a vector; but, since a vector has a direction as well as magnitude, smoothing or computing which uses the derivative or integral value of these signals must in some way consider the vector mathematics involved in order to provide correctly smoothed values.

It may be expressed, then, that a conventional fire control filter or computer making use of derivatives or integrals of the range signals will contain certain cross-product errors unless an appropriate method of removing them is provided. The cross-product terms arise due to the fact that the range information is expressed in a rotating coordinate system; namely, that of the radar antenna.

Devices which, in the past, have taken into account cross-product errors are complicated, cumbersome, and expensive. This invention proposes using a coordinate system for smoothing in which a portion of the cross-product terms reduce substantially to zero. Smoothed target range and velocity is computed utilizing a gyroscope to provide a reference coordinate system and as a computer element. As a result of choosing a particular coordinate system for smoothing, the computing equipment is relatively simple and inexpensive.

It is therefore an object of this invention to provide an improved smoothing system.

Another object of this invention is to provide an improved system for computation of information in a fire control system.

It is another object of this invention to provide a smoothing system for fire control information which takes into account the coordinate system in which the information is expressed.

A still further object of this invention is to provide a smoothing and computing system having a minimum response time.

Other objects of invention will become apparent from the following description taken in connection with the accompanying drawings, in which FIG. 1 is an illustration of the fire control vector problem showing the coordinate system of the radar antenna and the coordinate system of the airframe;

In FIG. 1, no components $r_j$ or $r_k$ exist of vector $\bar{r}$ inasmuch as the antenna is aimed directly at the target.

Figure 1:
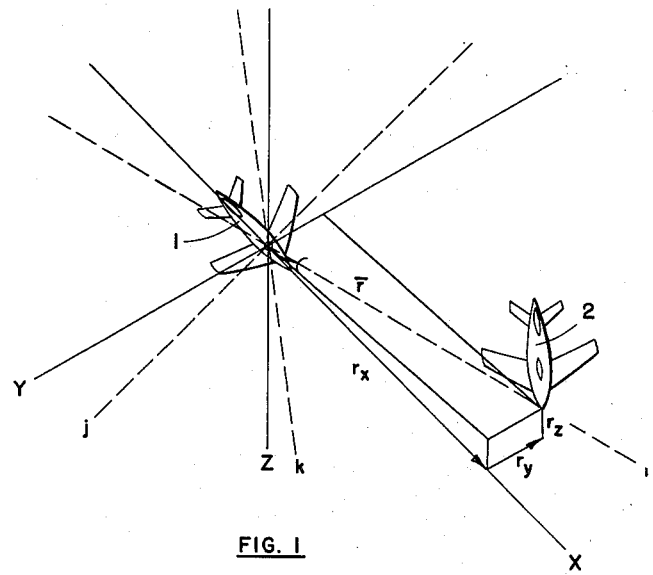
FIG. 1 illustrates the coordinate system $x$, $y$, $z$ of the airframe of interceptor 1 and the coordinate system $i$, $j$, $k$ of the radar antenna of interceptor 1.

The purpose of the device of the invention is to smooth target range information and compute target velocity information. Commencing with the coordinate systems of FIG. 1, it is assumed that axis $i$ of the antenna coordinate system lies substantially along the line of sight to the target 2 from interceptor 1. The radar provides range signal $\bar{r}$ which is substantially $r_i$.

It is desired to express $\bar{r}$ in the gyro coordinate system. This can be done by first obtaining $\bar{r}$ expressed in the airframe coordinate system, and it can be seen to be resolved into three components in that system, $r_x$, $r_y$, and $r_z$. Such transformation is accomplished by resolvers which indicate the angles between the airframe and antenna.

Figure 2:
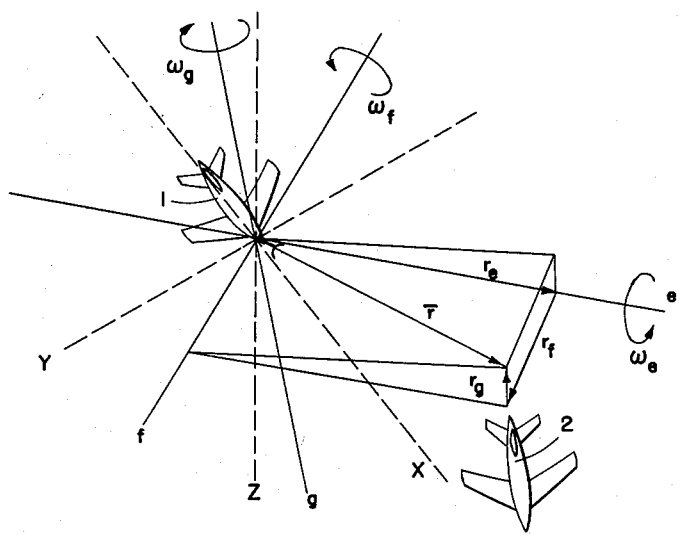
FIG. 2 is the fire control vector problem showing the coordinate system of the airframe and the coordinate system of the gyroscopic reference.

Then it is desired to transform $r_x$, $r_y$, and $r_z$ into components in the coordinate system $e$, $f$, and $g$ of a reference gyroscope. FIG. 2 shows the components $r_e$, $r_f$, and $r_g$ which now express the original vector $\bar{r}$ to the target. This transformation is accomplished by resolvers which indicate the angles between the reference gyroscope and the airframe. It is in this coordinate system of the reference gyroscope that smoothing and computing is accomplished. In FIG. 2, the target has advanced, and there is a slight time lag in information.

Using vector mathematics, computing the target velocity from the change in range with respect to time, the derivative of the vector $\bar{r}$ is:

(1) $$\dot{\bar{r}} = \left(\frac{d}{dt}\right)\bar{r} + \bar{\omega} \times \bar{r}$$

where $\dot{\bar{r}}$ = derivative of vector $\bar{r}$ $\left(\dfrac{t}{dt}\right)$ = rate of change of the component values of vector $\bar{r}$ with respect to time.

$\bar{\omega} \times \bar{r}$ = the cross-product term which is the rate at which the components of $\bar{r}$ will change because of the rotation of the coordinate system.

Resolving the vector $\bar{r}$ into its components $r_e$, $r_f$, and $r_g$, the derivative of each is:

(2) $$(\dot{\bar{r}})_e = \left(\frac{d}{dt}\right)r_e + \omega_f r_g - \omega_g r_f$$

(3) $$(\dot{\bar{r}})_f = \left(\frac{d}{dt}\right)r_f + \omega_g r_e - \omega_e r_g$$

(4) $$(\dot{\bar{r}})_g = \left(\frac{d}{dt}\right)r + \omega_e r_f - \omega_f r_e$$

where $\omega_e$, $\omega_f$, and $\omega_g$ = the angular velocity of the radar antenna coordinate system about its respective $e$, $f$, and $g$ axes.

Equations 2, 3 and 4 express the fact that a derivative (taken for the purpose of computing velocity or for smoothing) of the three radar range components in the illustration of FIG. 2 will contain errors unless the cross-product terms are included. In visualizing this, it is obvious that each of the vector components could well be changing due to shifting of axes $e$, $f$, and $g$ of the gyroscope, without the resultant $\bar{r}$ changing.

Figure 3:
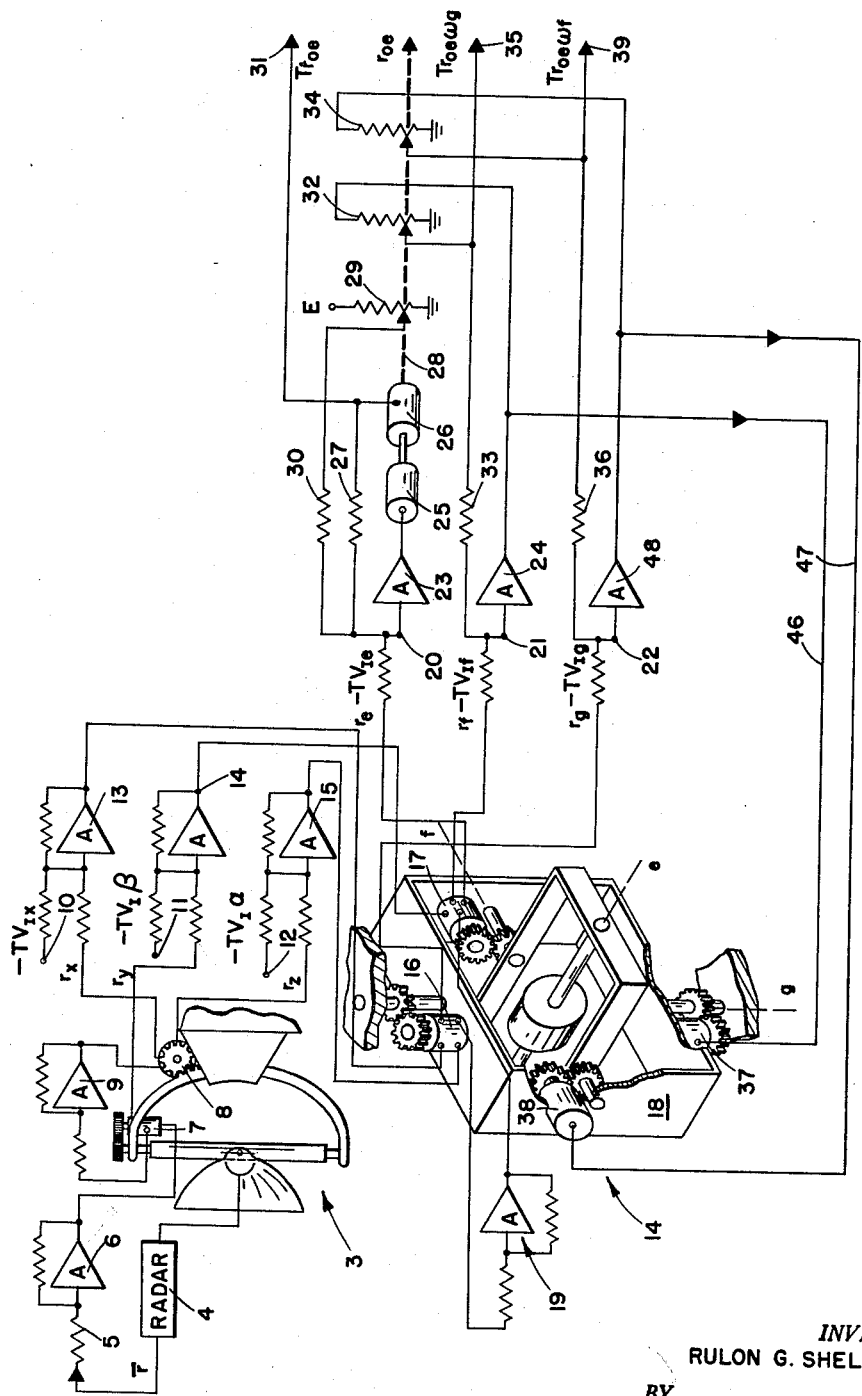
FIG. 3 is a diagram of the system showing the radar antenna, gyroscope, and the filter and computer circuit.

In the illustration of FIG. 3, a radar antenna 3 provides a return signal which indicates range to a radar 4 which provides a range signal $\bar{r}$ which is substantially $r_1$, to resistor 5 and feedback amplifier 6. Resolvers 7 and 8 together with feedback amplifier 9 transform the range signal $\bar{r}$ (its magnitude) into the coordinate system of the supporting structure, the airframe. These components are $r_x$, $r_y$, and $r_z$ of the coordinate system shown in FIG. 1. In order to minimize friction losses, the windings of these resolvers may be incorporated in the bearing structure, one resolver coil on the shaft and the other on the frame. Such structure will provide the desired angle transformation.

It can be understood that the target plane 2, being in flight, cannot swerve or maneuver radically. Therefore, its absolute velocity vector in space changes gradually. Due to the perturbations of the intercepting plane, however, a target may appear to be maneuvering more radically than it is. It would be well, then, in filtering target velocity to remove the effects of the interceptor's own velocity.

To remove these effects, the time constant of the filter (a fixed scale factor) multiplied by each component of velocity of the interceptor must be subtracted from each component of range. The interceptor velocity components are the true forward speed of the interceptor, along the $x$ axis, the skid or lateral speed along the $y$ axis, and the speed in the pitch plane, along the $z$ axis. These velocities are respectively $V_{Ix}$, $V_I\beta$, and $V_I\alpha$. The quantities $\beta$ and $\alpha$ are skid angle and pitch plane angle, respectively. Signals representing these velocity components are inserted at terminals 10, 11, and 12 and subtracted from the components of range $x_x$, $r_y$, and $r_z$ at the inputs to amplifiers 13, 14, and 15, respectively, and the resultant vector components are transformed into the coordinate system of the gyroscope by resolvers 16 and 17 and feedback amplifier 19.

Figure 4:
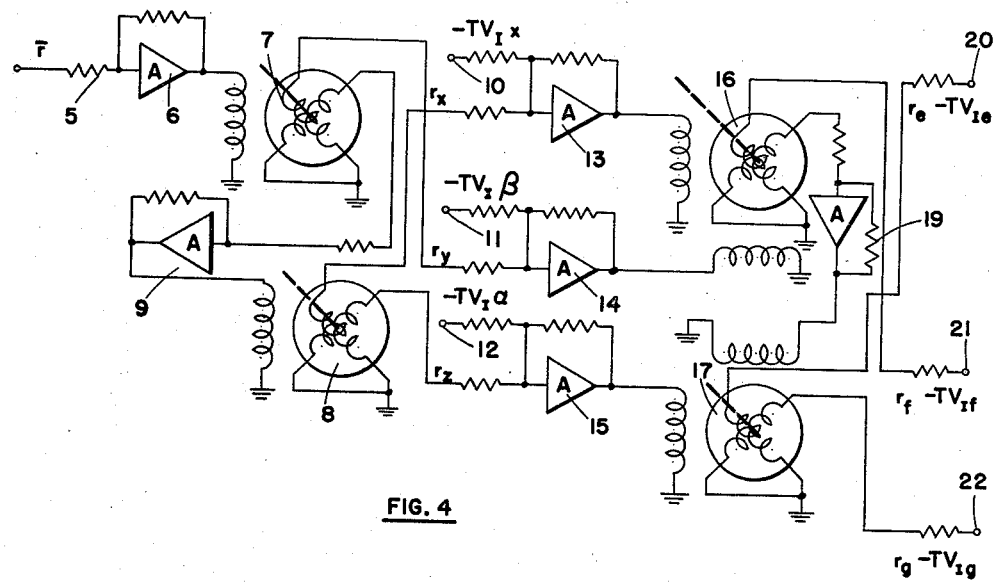
FIG. 4 is a schematic showing resolvers for transforming the electrical signals into the airframe and gyroscope coordinate systems.

Thus far, the radar range information and the interceptor velocity information have been transformed together into a coordinate system which is that of the reference gyroscope. FIG. 4 more clearly illustrates these transformations. In FIG. 4, it is shown how resolvers 7 and 8 transform the range component $\bar{r}$ into three components $r_x$ $r_y$, and $r_z$ in the coordinate system of the airframe. Components of range and interceptor velocity are combined and resolvers 16 and 17 then convert these signals into the coordinate system of the gyroscope, the outputs at points 20, 21, and 22 being $r_e-TV_{Ie}$, $r_f-TV_{If}$, and $r_g-TV_{Ig}$. It will be noted that the interceptor velocity components are multiplied by a factor "T." This was previously described to be the time constant of the filter, and is clarified hereinafter.

At the inputs to high gain amplifiers 23, 24, and 48, FIG. 3, are received the three components of range to the target, with interceptor velocity effects subtracted, all expressed in the coordinate system of gyroscope 14.

Amplifier 23 operates into a filter. In this instance, it is illustrated as a derivative feedback filter consisting of motor 25 and rate generator 26 combination in which the rate generator provides derivative feedback through resistor 27 to the input of amplifier 23. Positional feedback is also obtained through potentiometer 29 and feedback resistor 30. The output of this filter is filtered range represented by the position of the shaft 28 and filtered range rate represented by the output of the rate generator 26. A smoothed output of the range rate in the $e$ direction with the interceptor's velocity effects removed is received at point 31. It includes, of course, a scale factor "T" which is the filter time lag.

The filter, comprising motor 25 and rate generator 26 and included feedback circuitry, has a certain time constant. It depends on relative scale factors of signals received and feedback resistances 27 and 30 compared to the inputs to amplifier 23. Determining this time factor, or lag (characteristic of the given filter) it is then used as a scale factor on the velocity inputs to amplifiers 13, 14, and 15 as previously described. The actual multiplication may be incorporated by choosing the proper relative values of resistors at the inputs to amplifiers 13, 14, and 15.

Amplifier 24 energizes potentiometer 32 whose wiper is positioned by shaft 28. At output point 35 is received smoothed cross-product signal $Tr_{oe}\,\omega_g$, a component of relative target velocity. Resistor 33 provides feedback to the input of amplifier 24. Potentiometer 34 whose wiper is positioned by shaft 28 provides a smoothed cross-product signal, another relative target velocity component, $Tr_{oe}\,\omega_f$ at output point 39. Resistor 36 provides feedback to the input of amplifier 48.

Two-axis gyroscope 14 is adapted to be torqued about two axes in response to signals from amplifiers 24 and 48. Torquer motor 37 acts to rotate the outer gimbal of the gyroscope, and the torquer motor 38 acts to rotate the inner gimbal. The gyroscope will precess in accordance with the torquing signals and will indicate the direction to the target with a time lag "T" of information. Causing the gyroscope to precess in this manner, reduces quantities $r_f$ and $r_g$ shown by FIG. 2 to zero; and Equations 2, 3, and 4 become (5) $\qquad (\dot{\bar{r}})_e = \left(\dfrac{d}{dt}\right)r_e$ (6) $\qquad (\dot{\bar{r}})_f = r_e\omega_g$ (7) $\qquad (\dot{\bar{r}})_g = r_e\omega_f$ Referring to FIG. 2, the coordinate system $e$, $f$, $g$, of the gyroscopic reference, the gyroscopic reference is torqued until the subsidiary components of range $r_f$ and $r_g$ are equal to zero. To be more exact, referring to FIG. 3, the gyroscopic reference is torqued at rates proportioned to $$\frac{r_f - TV_{If}}{r_{oe}} \text{ and } \frac{r_g - TV_{Ig}}{r_{oe}}$$

In other words, the gyroscopic reference is continually torqued so that it defines a coordinate system which follows the target with a time lag "T." The target range information and interceptor velocity information are transformed into the coordinate system by resolvers 16 and 17, mounted on the gyroscopic reference. In this coordinate system, the smoothing and velocity computing is accomplished as shown in FIG. 3 by motor 25 and rate generator 26.

Figure 5:
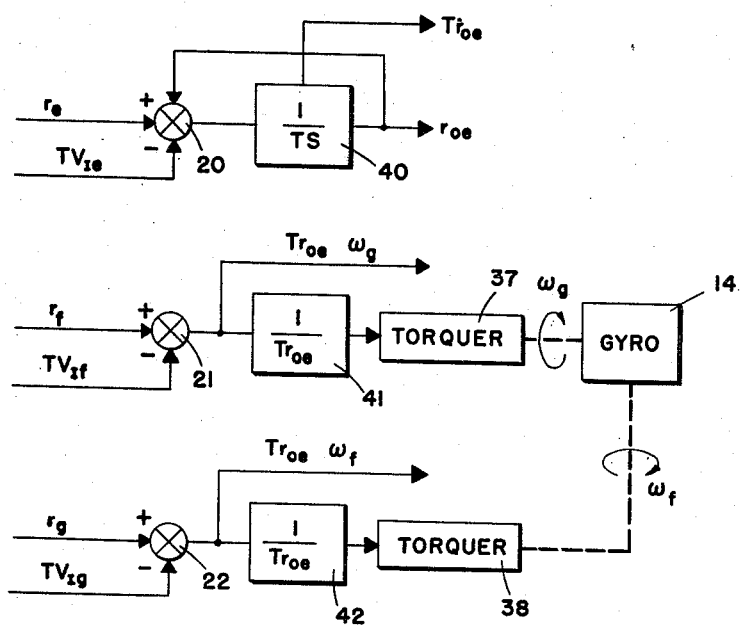
FIG. 5 is a block diagram of the device in transfer form notation.

FIG. 5 illustrates in transfer notation form the requisites of the device. At differential junctions 20, 21 and 22 are received the range signals and interceptor velocity signals expressed in the coordinate system of a gyroscopic reference. Block 40 which represents the motor generator feedback filter of FIG. 3 which has a transfer function which is $$\frac{1}{1+TS}$$

where "T" is the time lag of the filter and "S" is the Laplace transform notation for a complex variable indicating a first derivative of the variable with respect to time.

From FIG. 5 what is essential in the device of invention is the filtering of the primary component of range with the effects of interceptor velocity removed and then using that quantity to obtain the components of the rate of change of filtered range to the target, as indicated by blocks 41 and 42. The filtering, according to $$\frac{1}{Tr_{oe}}$$

indicated by blocks 41 and 42, is obtained by potentiometers 32 and 34, FIG. 3, respectively. High gain amplifiers 24 and 48 aid in accomplishing this. While the outputs of amplifiers 24 and 48 are multiplied by the smoothed range signal by potentiometers 32 and 34, feeding back these signals to the input of amplifiers 24 and 48 results in division. The outputs of amplifiers 24 and 48 are, therefore, component signals divided by the smooth range signal. These signals are then used to torque the gyroscope. The torquing that is required to cause the gyroscope to follow the target provides the angular velocities $\omega_g$ and $\omega_f$, FIG. 5. The outputs of the device as indicated in FIGS. 3 and 5 are three components of filtered range rate, $Tr_{oe}$, $Tr_{oe}\omega_g$, and $Tr_{oe}\omega_f$, and filtered range $r_{oe}$.

Figure 6:
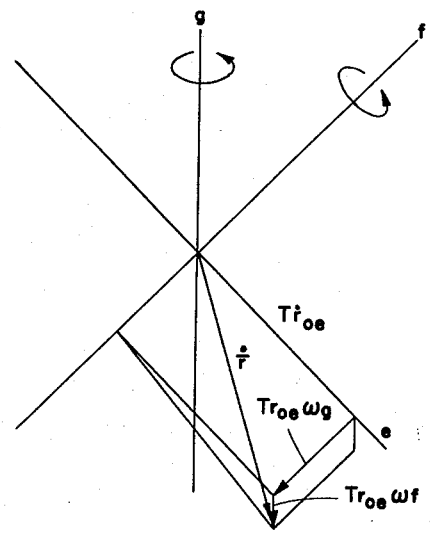
FIG. 6 shows the components of target relative velocity.

FIG. 6 indicates the three components of relative target velocity computed by the device.

Figure 7:
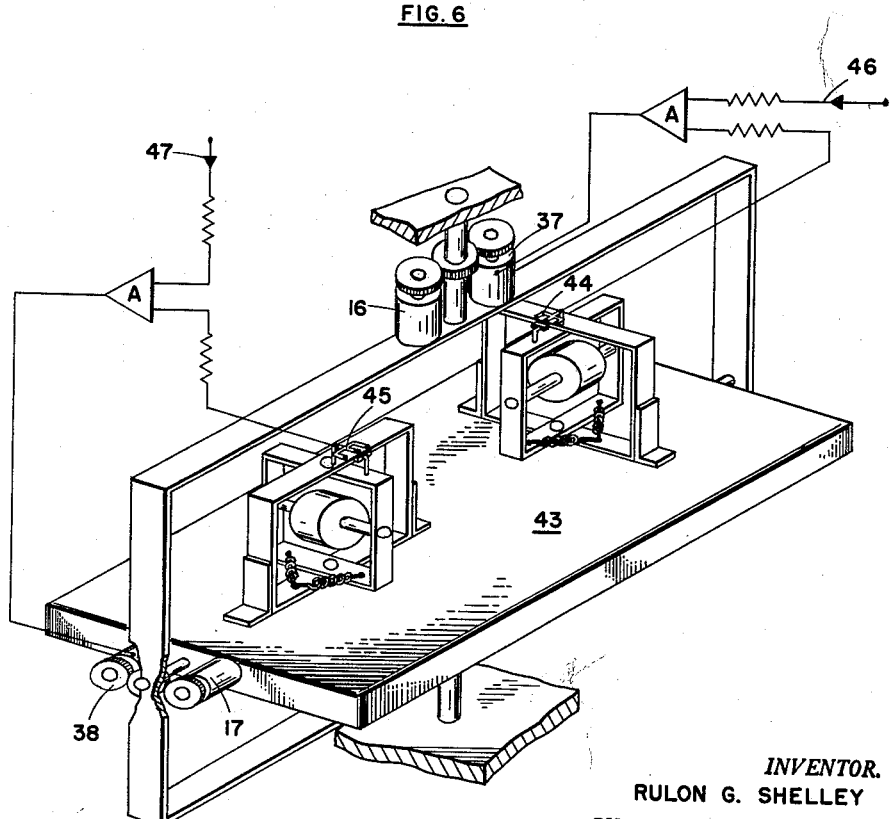
FIG. 7 is an illustration of the two single-axis gyroscopes providing a platform reference in the device of the invention.

Two single axis rate gyroscopes (spring restrained) mounted on a gimballed platform 43, FIG. 7, may provide a gyroscopic reference in substitution for the two-axis gyroscope of FIG. 3. Torque motors 37 and 38 act to rotate the platform in response to the signals received through lines 46 and 47 (refer to FIG. 3) and, in addition, in FIG. 7 to the E-type pickoffs 44 and 45.

Although the invention has been described and illustrated in detail, it is to be clearly understood that the same is by way of illustration and example only, and is not to be taken by way of limitation, the spirit and scope of this invention being limited only by the terms of the appended claims.

I claim:

1. A vector computing and filtering system comprising means producing signals representing the components of a vector expressed in a first coordinate system, a torqued gyroscopic reference defining a second coordinate system, means for transforming said signals into signals representing said vector in said second coordinate system defined by a gyroscopic reference, means for filtering one of said transformed components of said vector, means for modifying the remaining transformed components according to said filtered component to obtain the components of the rate of change of said transformed vector, and means for torquing said gyroscopic reference to thereby orient said second coordinate system in accordance with said modified components of said vector.

2. A vector computing and filtering system comprising means for producing signals indicating the components of a vector in a first coordinate system, a gyroscopic reference device, means for transforming said signals into signals representing said vector in the coordinate system of said gyroscopic reference device, means for filtering one of said transformed signals, means for dividing the remaining transformed signals by said filtered transformed signal, and means for torquing said gyroscopic reference device in accordance with said divided transformed signals.

3. In an information smoothing and computing system comprising a gyroscopic reference, angle resolving means mounted to determine the angles through which said gyroscopic reference is rotated, said resolving means adapted to receive and transform signals representing target range information into the coordinate system of said gyroscopic reference, a filter connected to receive one of said signals representing a first component of range from said resolving means, and means for dividing the other signals representing components of range by said signal representing a first component of range, and means for torquing said gyroscopic reference in accordance with the divided signals.

4. In an information smoothing and computing system comprising a two-axis gyroscopic reference, resolving means mounted to determine the angles through which said gyroscopic reference is rotated and connected to receive signals representing target range information and signals representing velocity information of said system and transforming said range and velocity information into the coordinate system of the gyroscopic reference, a filter adapted to receive the signal representing a first component of range and velocity from said resolving means, and means for torquing said gyroscopic reference in accordance with the signals representing the remaining components of range and velocity from said resolving means divided by said filtered signals representing the first component of range and velocity.

5. In a fire control system carried in a vehicle, a smoothing and computing fire control system comprising a radar, first resolving means mounted to determine the angles between the antenna of said radar and said vehicle and connected to receive target range information, a two-axis gyroscope, second resolving means mounted to determine the angles through which said gyroscope is rotated and connected to receive the output of said first resolving means and connected to receive information representing the velocity of said system, a filter connected to receive the principal component of target range and system velocity from said second resolving means, and means for torquing said gyroscope about its two axes in accordance with the output of said filter and the remaining components of target range and system velocity.

6. In an information smoothing and computing system comprising a two-axis gyroscopic reference, first receiving means mounted to determine the angles through which said gyroscopic reference is rotated and adapted to receive and transform signals representing target range information less system velocity information into the coordinate system of said gyroscopic reference, a filter connected to receive the signals representing the principal component of target range less the signal representing the principal component of system velocity from said resolving means, high gain amplifying means connected to receive the signals representing the subsidiary components of target range and system velocity from said first and second resolving means, means for multiplying the output of said high gain amplifying means by the output of said filter, feedback means from said multiplying means to said amplifying means, and means for torquing said gyroscopic reference about its two axes in accordance with the output of said high gain amplifying means.

7. In an information smoothing and computing system comprising a support structure, a radar, a first resolver and a second resolver mounted to determine the angles of rotation between the antenna of said radar relative to said support structure, said resolvers connected to receive and transform signals representing target range into components in the coordinate system of said support structure, a two-axis gyroscopic reference, third and fourth resolvers mounted to determine the angles of rotation between said gyroscopic reference and said support structure, said third and fourth resolvers connected to receive and transform the output of said first and second resolvers including information as to system velocity into components in the coordinate system of said gyroscopic reference, three high gain amplifiers each adapted to receive corresponding components of target range and system velocity from said third and fourth resolvers, a filter connected to receive the output of the first of said high gain amplifiers, means for multiplying the output of said second high gain amplifier by the output of said filter and means for feeding back said multiplied output to the input of said second high gain amplifier, means for multiplying the output of said third high gain amplifier by the output of said filter and means for feeding back said multiplied output to the input of said third high gain amplifier, means for torquing said gyroscopic reference about one of its axes in accordance with the output of said second high gain amplifier, and means for torquing said gyroscopic reference about the other of its axes in accordance with the output of said third high gain amplifier.

8. The combination recited in claim 7 wherein said filter includes derivative feedback and an output terminal in said feedback circuit whereby said feedback circuit provides a filtered component of target velocity.

References Cited by the Examiner

UNITED STATES PATENTS

| | | | |
|---|---|---|---|
| 2,408,081 | 9/46 | Lovell | 235—61.5 |
| 2,449,035 | 9/48 | Coffin et al. | 343—7.7 |
| 2,688,442 | 9/54 | Droz | 235—61 |
| 2,832,552 | 4/58 | Schuck | 235—61.5 |
| 2,879,502 | 3/59 | Miller. | |

MALCOLM A. MORRISON, *Primary Examiner.*

NORMAN H. EVANS, *Examiner.*